Oct. 11, 1949.  E. M. BARBER  2,484,009
INTERNAL-COMBUSTION ENGINE AND
METHOD OF OPERATING SAME
Filed Feb. 25, 1948  3 Sheets-Sheet 1

INVENTOR.
EVERETT M. BARBER
BY
ATTORNEY

Oct. 11, 1949.　　　　　E. M. BARBER　　　　　2,484,009
　　　　　　　　INTERNAL-COMBUSTION ENGINE AND
Filed Feb. 25, 1948　　　METHOD OF OPERATING SAME　　　3 Sheets-Sheet 3

Fig. 7

Inventor:
EVERETT M. BARBER
By Daniel Styker
   J. H. Graham
Attorney:

Patented Oct. 11, 1949

2,484,009

UNITED STATES PATENT OFFICE 2,484,009

INTERNAL-COMBUSTION ENGINE AND METHOD OF OPERATING SAME

Everett M. Barber, Wappingers Falls, N. Y., assignor to The Texas Company, New York, N. Y., a corporation of Delaware Application February 25, 1948, Serial No. 10,598

14 Claims. (Cl. 123—32)

This invention relates to an internal combustion engine and to a method of operating such an engine.

This is a continuation-in-part of my copending application Serial No. 513,232 filed December 7, 1943, now abandoned, which in turn is a continuation-in-part of Serial No. 463,031 filed October 23, 1942, now abandoned.

One of the principal objects of the invention is to eliminate spontaneous ignition or knocking in an engine of this type irrespective of the spontaneous ignition quality of the fuel employed.

Another object of the invention is to provide an engine of this type capable of operation without knocking even at extremely high compression ratios as well as at increased charge densities, and capable of delivering greatly increased specific output regardless of the ignition quality of the fuel, as well as operating with greatly improved economy.

Still another object of the invention is to provide for the simple and economical conversion of present internal combustion engines to utilize the principles of the present process and achieve the advantages thereof.

Other objects and advantages of the invention will be apparent from the following description when taken in conjunction with the appended claims and attached drawing.

The specific output or power developed by present-day Otto cycle and mixed cycle internal combustion engines has been limited by maximum compression ratios and specific charge densities, above which knocking of the engine occurs. According to accepted understanding of engine knocking, as verified by photographic and other types of demonstration, knock results from spontaneous ignition reactions between the gasoline hydrocarbons and the air and residual gas present in the "end gas," which expression signifies the remaining portion of unburned fuel mixture existing in the combustion space at the time of spontaneous ignition.

In the typical operation of an internal combustion engine of the Otto cycle type, fuel-air mixture is usually introduced through a manifold into the engine cylinder where it is mixed with residual gas from the last previous cycle. In any event, the combustion space is filled, or largely filled, with a more or less homogeneous combustible fuel-air-residual gas mixture prior to ignition. This mixture is compressed by the upward motion of the piston to the instant in the cycle where the spark fires and ignites the mixture. When the spark fires, a flame front is formed which tends to progress outwardly from the point of ignition in an approximately spherical form until the cylinder charge is consumed. Thus, after spark ignition, the portion of the fuel-air-residual gas mixture which is burned last (the "end gas") will be compressed further by the continued upward motion of the piston and also by the expansion of the portion of the fuel mixture that has already been burned. During this compression of the end gas, its pressure, temperature and density are increased to very high values at which spontaneous ignition reactions tend to take place.

If the pressure, temperature and density of this end gas are raised to the values producing spontaneous ignition before the end gas is consumed by the normal progress of the flame front, then knock occurs. If the combustion reactions proceed more slowly so that the end gas is consumed by the normal progress of the flame front before conditions are reached giving rise to spontaneous ignition of the end gas, then knock does not occur. Thus, the occurrence or non-occurrence of knock may be regarded as a race between the progress of the spontaneous ignition reactions and the normal progress of the flame front.

The occurrence of knock is jointly dependent on the fuel and the engine and its condition of operation, and characteristically limits the performance obtainable from an Otto cycle type of internal combustion engine. Higher compression ratios or higher charge densities, or both, result in higher pressures and densities of the fuel mixture within the end gas zone of the combustion space and tend to give rise to knocking of the engine.

Heretofore, two basic methods have been employed to reduce or inhibit knocking in such an engine. First, fuels have been made more resistant to the spontaneous ignition reactions that lead to knock. This has been accomplished by producing fuels of higher octane number, either by the use of hydrocarbons of initially high octane or by the use of dopes or anti-knock reagents, or both. Secondly, engine combustion chamber designs have been developed to reduce, as far as possible, the severity of the end gas conditions that accelerate the spontaneous ignition reactions. The Ricardo head, which traps the end gas in a space of very large surface to volume ratio, is an example of this second method.

The above-noted methods heretofore employed nevertheless retain inherent limitations, because the tendency to knock is merely reduced and not prevented. Even with the highest octane fuels that are commercially available in volume production, and the most efficient design of combustion chamber available, compression ratios have been limited to about 7.5:1, and fuel mixture densities have been limited to a figure corresponding to about atmospheric intake pressure, or a slight superatmospheric pressure, for that specified compression ratio. The net result has been that the specific output or power developed has been limited by this problem of knocking and the related problem of preignition.

In accordance with the present invention, combustion is carried out within the engine cylinder in such a manner that knocking will not occur, irrespective of the octane number or cetane number of the fuel employed, the volatility of the fuel over a broad range, the compression ratio, the fuel-air mixture ratio and the fuel-air mixture density used. This is accomplished by the expedient of preventing sufficient fuel from mixing with that portion of the air within the combustion space which would normally form the so-called "end gas," so that a combustible mixture is not present in this end gas zone, and so that the advancing flame front traps and compresses only incombustible gas. In the preferred embodiment of the invention, air unmixed with fuel, or air containing insufficient fuel to support combustion, is introduced into the combustion chamber and compressed on the compression stroke. Fuel is injected into this compressed air at a point near the top of piston travel, under conditions such that all or part flash vaporizes or exists in vapor state to form a combustible fuel vapor-air mixture at the point of ignition and with a comparatively short travel from the point of injection. The amount and direction of fuel injection during this period from injection to ignition is so controlled that the fuel mixes only with a localized portion of the air within the combustion space. This first increment of injected fuel forms a localized combustible mixture which is immediately ignited by spark or other suitable means, which establishes a flame front. The injection of the fuel is continued during the balance of the injection period into a narrow zone or zones of the combustion chamber immediately in advance of the flame front in its direction of burning.

The net result is that any combustible fuel-air mixture undergoing combustion within the cylinder is so rapidly consumed after formation that it is, at all times, cushioned by a mass of incombustible gas, either air or products of combustion, or both. Consequently, there is eliminated the formation of highly compressed and heated end gases consisting of combustible fuel-air mixture, and knocking is not possible.

The invention is illustrated in the attached drawing which discloses preferred embodiments thereof.

Figure 1:
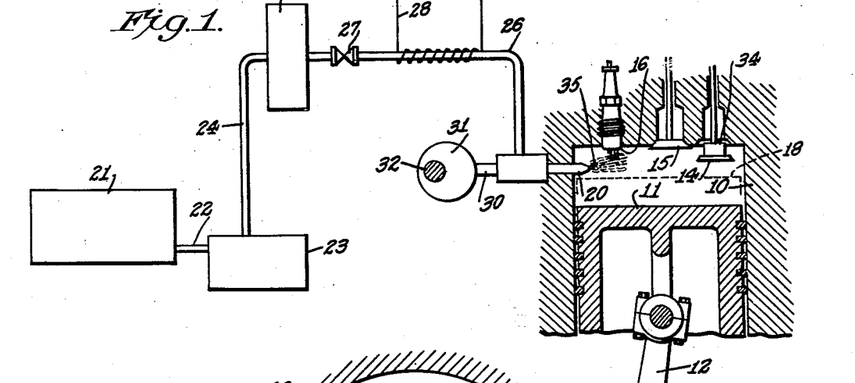
Fig. 1 is a diagrammatic illustration of an engine cylinder with appurtenances including the fuel injection system.

Referring to Fig. 1, the engine cyclinder is indicated at 10 with piston 11 and connecting rod 12 which runs to the usual crankshaft, not shown. The cylinder head is equipped with suitable ports controlled by an intake valve 14 and an exhaust valve 15, and an opening receiving a spark plug 16 connected to any conventional ignition system. Communicating with the intake valve 14 is a conventional air intake pipe or manifold which may contain a customary air filter (not shown). Communicating with the exhaust valve 15 is a customary exhaust pipe which may contain a suitable muffler (also not shown).

A fuel injection nozzle 20 extends through a suitable opening in the cylinder head, and as shown is directed to discharge in a generally tangential direction within the combustion space. Fuel from a suitable source of supply or tank 21 is drawn through line 22 by fuel pump 23, driven by the engine in any conventional manner. The fuel pump forces the liquid or liquefied fuel under pressure of about 500–6000 pounds per square inch through line 24 into an accumulator tank 25, from which it passes through line 26 leading to the injection nozzle 20. In a unit injector system, very much higher pressures up to 40,000–50,000 pounds per square inch may be employed. Line 26 contains a check valve 27 and may be equipped with a suitable heating means, shown as an electrical heating coil 28. While any conventional fuel injection system can be employed, the one shown is of particular adaptation to multi-cylinder engines, since the separate cylinders and their respective injection nozzles can be supplied through individual lines 26 running from the accumulator tank 25.

Any suitable and conventional means for regulating the quantity of fuel injected and the time of fuel injection in relation to the engine cycle can be employed. As diagrammatically illustrated, the injection nozzle 20 is equipped with spring-actuated valve 30 having a valve stem operated by cam 31 carried by cam shaft 32, which is inter-connected to be driven by the engine in any conventional manner. Cam 31 may be adjusted relative to the piston stroke to control the time of fuel injection or injection advance, and adjusted relative to the valve stem to control the length of time of opening of the valve 30 to control the rate of fuel injection and the amount of fuel injected on each stroke. As controls for this purpose are conventional and well known, no further illustration thereof is thought necessary. It is to be understood that the quantity and rate of fuel injection and the injection advance can be controlled by a cam-operated plunger-type fuel pump cooperating with a pressure-operated check valve in the injection nozzle in conventional manner, instead of the arrangement described above.

Figure 2:
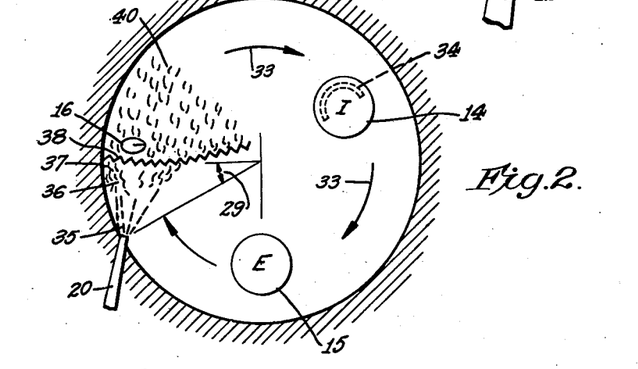
Fig. 2 is a horizontal diagrammatic view looking upward in the cylinder of Fig. 1, illustrating the location of the spark plug and fuel nozzle, and the type of combustion occurring in the combustion space.

Referring more particularly to Fig. 2, the intake valve 14 is equipped with a shroud 34 so positioned as to direct the incoming air in a tangential direction to produce a swirling movement of the air within the combustion space as indicated by the arrows 33. In operation, a charge of air unmixed with fuel, or containing less than that amount of fuel which will support combustion, is drawn into the cylinder on the suction stroke of the piston 11. While not shown, it is to be understood that the engine may be equipped with a supercharger so that the air can be introduced at increased density or under boost pressure. This air, or dilute fuel-air mixture, is then compressed on the compression stroke of the piston, the swirling movement being continued. It is well established that a high velocity of swirl within the combustion space can be imparted, such that the R. P. M. of the air is several times the R. P. M. of the engine at the end of the compression stroke.

Near and generally somewhat before the position of top dead center of piston travel, as indicated by the dotted line 18 in Fig. 1, fuel is injected from the nozzle 20 into the swirling air in a generally tangential direction of the combustion space (Fig. 2) and in a somewhat upwardly inclined direction (Fig. 1) to bring the edge of the spray form closely adjacent the electrodes of spark plug 16. It is to be understood that the upwardly inclined direction of the spray applies to this particular embodiment of the invention, where a comparatively flat spray is used and the electrodes of the spark plug are near the top of the combustion space above the horizontal plane of the injection nozzle tip. However, where a fatter or cone-shaped spray is used, or where the spark plug enters the combustion chamber radially with the electrodes closer to the horizontal plane of the nozzle tip, this upward inclination of the spray need not be employed but the injection may be in a true horizontal plane or even inclined somewhat downwardly in some cases. This fuel is so highly atomized and is at such temperature and pressure that it flash vaporizes, or forms vapor very rapidly, and the resulting fuel vapor is intimately mixed with the swirling air to form a combustible mixture within a short travel of the fuel from the nozzle and about the time the said resulting fuel vapor-air mixture reaches plug 16. The spray form from nozzle 20 is preferably fan shaped as viewed in Fig. 2 and flattened as viewed in Fig. 1 to conform to the shape of the combustion space so as to uniformly impregnate the swirling air as the latter passes slightly beyond the point of fuel injection. At the outlet of the injector, the spray is apparently highly atomized as indicated at 35, so that it begins to vaporize and mix with the swirling air to form the ultimate combustible mixture. As evident from Fig. 2, the dispersion of the fuel in zone 35 is concentrated in a fan shape, which is directed along a chord of the combustion space. As the spray form moves outwardly to the position indicated by the numeral 36, the swirling air tends to deflect fuel vapor toward the cylinder wall as indicated at 37, facilitating the proper mixing of the vaporized fuel with the swirling air and tending to produce a uniform mixture. The zones 35—36 therefore constitute the region of impregnation of the air with the fuel, and the region of formation of a combustible fuel vapor-air mixture.

Just as or very shortly after the first increment of injected fuel reaches the location of spark plug 16 (by which time it has formed the said combustible fuel vapor-air mixture with the swirling air), a spark at the electrodes of plug 16 ignites this mixture establishing a flame front as indicated at 38. As shown in Figs. 1 and 2, the positioning of plug 16 is so correlated with the positioning of nozzle 20 and the spray form produced by that nozzle, that the electrodes of the plug are within the combustible fuel vapor-air mixture, but are not contacted by unvaporized liquid fuel particles, whereby ignition of this first increment of entering fuel is insured. The heat of combustion causes rapid expansion of the mixture and burning products whereby the flame front 38 assumes a shape such as that shown in Fig. 2.

The spark plug 16 is spaced from the injection nozzle 20 a sufficient distance to permit the formation of the combustible fuel vapor-air mixture during the intervening travel of the injected fuel, while at the same time the plug 16 is sufficiently close to nozzle 20 to prevent the accumulation within the combustion space of any substantial amount of combustible mixture prior to ignition. In the particular arrangement shown, employing a cylinder having a bore diameter of 3¼ inches, good results have been secured with an included angle 29 of about 30–90° and preferably about 30–45° between the radii passing through the plug 16 and the tip of nozzle 20 respectively. It is to be understood that the spray pattern, fuel intensity of the jet and the velocity of the swirling air are altered and correlated for the different spacings of the plug and nozzle tip in order to obtain the desired knock-free operation. In general, it can be stated that the included angle 29 should be greater than about 20° and less than about 135°. In this manner, the fuel vapor-air mixture is ignited almost as soon as it is formed and before an opportunity is afforded for the injected fuel to mix with air throughout any substantial extent of the combustion space. The net result is that combustible fuel vapor-air mixture is produced only within a localized zone of the combustion space adjacent the plug 16, and this mixture is surrounded and cushioned by incombustible air or gas on one side and by incombustibly rich mixture on the other. Thus, at the beginning of ignition, there is an insufficient amount of combustible fuel vapor-air mixture within the combustion space to cause knock. The established flame front 38 tends to travel toward the nozzle 20; but the high swirling movement of the air and other gases within the combustion space coupled with the incombustibly rich mixture near the nozzle, tends to counteract actual relative movement of the flame front with respect to the cylinder wall, so that the flame front may remain comparatively stationary or in a fixed location with respect to the cylinder wall, fuel nozzle, and ignition plug.

In actual practice, the start of fuel injection may be as much as 75° before top dead center; it may be, for example, about 40° for maximum power where substantially all of the air within the combustion space is to be consumed. The spark advance is synchronized with the injection in a manner hereinafter described in greater detail so that a spark of igniting intensitiy is present at the plug when the first portion of combustible fuel vapor-air mixture reaches the plug. It will be understood that the above figure for maximum power applies for a particular set of conditions of engine size and construction, for example, a 3¼" bore engine having the construction shown, and the settings may be different for maximum power in the case of other engine sizes and constructions. Where the power requirement is less, the beginning of fuel injection may be at, or as much as 20° after, top dead center; or, for the smaller power requirements, the injection may still be initiated considerably prior to top dead center and cut off so that only that portion of the air is consumed which is necessary to supply the power required. In any event, one important consideration resides in the control of the quantity of fuel injected before ignition and its confinement to a narrow zone of the combustion space, so that the fuel mixes with only a localized portion of the air therein before combustion of this fuel-air mixture begins. Another important consideration resides in the positioning of the spark plug with reference to the injection nozzle and the synchronization of the spark timing with respect to the injection timing so that combustion is initiated in the localized portion of fuel-air mixture as soon after the beginning of injection as the first fuel impregnated increment of combustible mixture reaches the spark plug.

If too much fuel is injected before the spark ignites the resulting fuel vapor-air mixture, then the fuel vapor disseminates too widely throughout the combustion space, and there is such a large volume of combustible fuel vapor-air mixture present therein at the time of ignition that a substantial time period is required for the flame front to progress across this initially-formed combustible zone. This approaches the combustion conditions occurring in conventional Otto cycle operation, wherein the advancing flame front can highly heat and compress unburned combustible mixture to the point of spontaneous ignition and knock occurs. On the other hand, if the spark occurs too soon and is not maintained, then opportunity is not given for the initial formation of a combustible mixture during the time the spark is on. This means that the first increment of combustible mixture will not be ignited as it reaches the plug, and additional fuel will be injected and combustible fuel-air mixture accumulated and compressed in the combustion space until spontaneous ignition may occur with a high cetane number (low octane number) fuel, or the charge misfires entirely with a low cetane number fuel. Of course, this spontaneous ignition condition simulates operation on the Diesel cycle and produces the characteristic Diesel thump or knock, which operation is not independent of the fuel quality. These objectionable conditions are avoided in accordance with the present invention by insuring spark control of the ignition and by control of the rate of fuel injection and synchronization of the injection advance with the spark advance, in accordance with the relative positioning of the nozzle and spark plug, the diameter of the cylinder, the velocity of air swirl, and the spray pattern. As described hereinbelow, a multiple spark or continuous spark of definite duration may advantageously be employed to obviate the necessity for the critical synchronization of the injection advance with the spark advance as is required with an instantaneous spark.

During the continuance of that portion of the compression or combustion stroke, or both, which falls within the period of fuel injection, additional fuel is injected toward the flame front 38 and is mixed with fresh quantities of the swirling air to form combustible fuel vapor-air mixture that is ignited and burned as it reaches the flame front. It will be noted that the combustion of this additional fuel-air mixture takes place almost as rapidly as formed, and that no opportunity is given for unburned fuel to become disseminated widely throughout the combustion space. The first portions of fuel-air mixture, which were rapidly burned at the flame front, become incombustible exhaust gases which continue the swirling movement around the cylinder as indicated at 40. Consequently, even if the period of fuel injection is continued until substantially all of the air within the cylinder is consumed, the last volume of combustible fuel mixture formed is still confined by a cushion of incombustible exhaust gases. Where the period of fuel injection is terminated prior to consumption of all the air, the last fuel mixture formed is confined on the front side of its swirling movement by the exhaust gases and on the rear side by incombustible mixture or air. Thus, combustion to develop the power required on each stroke is accomplished while avoiding the formation of highly heated end gases of combustible fuel-air mixture trapped by the flame front, so that no opportunity is presented for the occurrence of spontaneous ignition with resultant knock. Also, since the fuel is ignited almost instantly after injection, there is no problem of an uncontrolled pre-ignition.

In this method of operation, another important consideration is the proper correlation of directional air movement or swirl with the rate of fuel injection and the spray pattern, so as to uniformly impregnate with fuel the required volume of air consumed on each cycle, to thereby give a fuel-air ratio of the mixture approaching the flame front 38 which is within the combustible limits and is preferably about 0.06 to 0.08 for desired efficiency. This requires a directed or controlled movement of the air within the combustion space passing the locus of injection, which movement is of a sufficiently high velocity that a complete rotation of the contents of the combustion space can occur within the normal period of fuel injection for full power of about 30-90 crank angle degrees. The desired directional flow of air can be conveniently secured by utilizing a disc-shaped combustion chamber equipped with means for producing induction swirl of the air as illustrated. While the piston and cylinder head are shown in Fig. 1 as being flat, one or both may be dished or crowned. It is to be understood that the term "disc-shaped" is used in a broad sense as meaning a combustion space which is generally circular in cross-section as defined by a geometrical figure spinning on its axis, but which may have various configurations in axial section due to dishing or crowning of the piston or cylinder head or both. An important feature of the present invention resides in the fact that the no-knock combustion is accomplished in the power cylinder combustion space, and the provision of an ante-chamber or auxiliary combustion space, or a separate compressor cylinder, having open communication with the main combustion space within the power cylinder, is rendered unnecessary. Wherever the expression "power cylinder providing a combustion space" or a similar expression is used in the claims, it will be understood that this means a combustion space confined between the piston and cylinder head of the power cylinder and which is free from open communication with any ante-chamber, compressor cylinder or other auxiliary combustion space.

The desired velocity of induction air swirl has been readily secured by directing the air on the suction stroke of the piston through a shrouded intake valve, wherein the shroud 34 extends about 180° around the valve, the ends of the shroud being positioned substantially on a radius of the combustion space. With any particular injection rate and spray pattern for a given location of the spark plug with reference to the fuel nozzle, the shrouding of the valve is found to be critical within easily determined limits. For example, it has been found that either increasing or decreasing the circumferential extent of the shroud about the valve more than about 10° for a particular set-up which gave knock-free operation with a 180° shroud, gave rise to knocking. Likewise rotating the 180° shroud more than 20° from the said position illustrated in Fig. 2 for the particular set-up also gave rise to knocking. It will be appreciated that these changes in the shroud altered the velocity of air swirl to such an extent that the same rate of fuel injection with the same spray pattern either over or under impregnated the air passing the injection nozzle so that the first increment of fuel vapor-air mixture reaching the plug 16 failed to ignite. However, this difficulty could then be overcome by correlating the injection rate and spray pattern with the new air velocity. For example, a 120° shroud operated satisfactorily with a properly correlated injection rate and spray pattern. While certain figures for circumferential extent and positioning of air shroud have been given above, this is to be understood as being merely by way of example and not by way of limitation. The induction air swirl can also be secured by arranging the air inlet passage so as to be generally tangential to the combustion space, in place of the shrouded valve construction illustrated.

In order to efficiently consume the air within the combustion space to provide maximum power and high volumetric efficiency on each cycle, the spray pattern is designed to uniformly impregnate the air in its swirling movement. This requires a greater proportion of fuel toward the circumference of the combustion space with progressively lesser proportions toward the center. Such uniform impregnation is accomplished in the construction shown by arranging the fan-shaped spray to one side of the combustion space, so that the outer edge of the fan is close to the cylinder wall, while the inner edge of the fan is offset from the center of the combustion space. The expansion of the products of combustion then causes sufficient movement of vaporized fuel toward the center to effect the desired impregnation of the lesser amount of air in this region.

As hereinbefore stated, the rate of fuel injection and spray pattern are coordinated with the velocity of air swirl so that any portion of the swirling air which is impregnated and consumed on each cycle receives a regulated amount of fuel to produce a fuel-air ratio within the combustible limits for efficient combustion. Normally, the rate of fuel injection is set to give a fuel-air ratio of around 0.06 for light and intermediate loads up to the point where substantially all of the air within the combustion space is consumed. To further increase the power produced on each cycle for maximum loads, such as for aircraft take-off or maneuvers, the fuel rate is increased for a given velocity of swirling air so as to uniformly impregnate that air at a fuel-air ratio up to about 0.08. It will be appreciated that proper correlation of the directional flow of air with the rate of injection and spray pattern in this method of operation is an important consideration, since the method depends upon the rapid formation of combustible fuel-air mixture and its consumption by combustion substantially as rapidly as formed. Consequently, the customary non-directional or turbulent movement of air within a combustion space, which is not equipped with some means for creating the swirling or directed movement, is ineffective in attaining the desired no-knock operation of the present invention with a fixed locus of fuel injection.

The products of combustion produced on each cycle are expanded on the power stroke and are discharged through the exhaust valve 15 on the exhaust stroke in four-cycle operation. The cycle is then repeated in the manner described.

Figure 3:
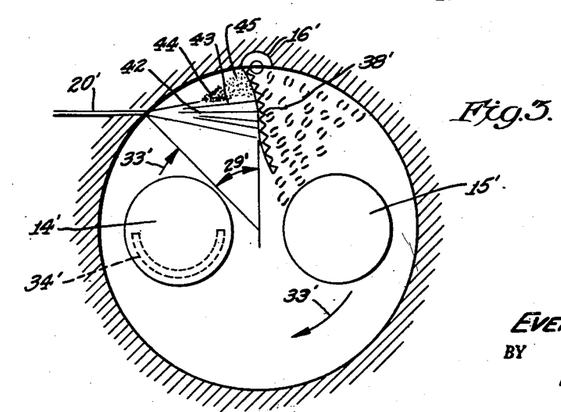
Fig. 3 is a horizontal view similar to Fig. 2 of a modification.
Figure 5:
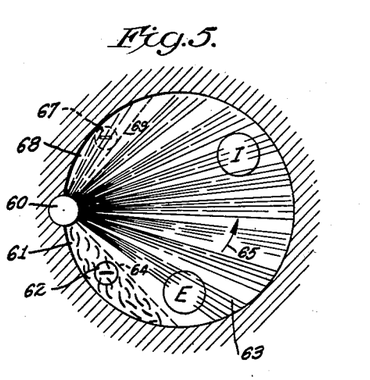
Fig. 5 is a horizontal view similar to Fig. 2 and shows a further modification of the invention.
Figure 6:
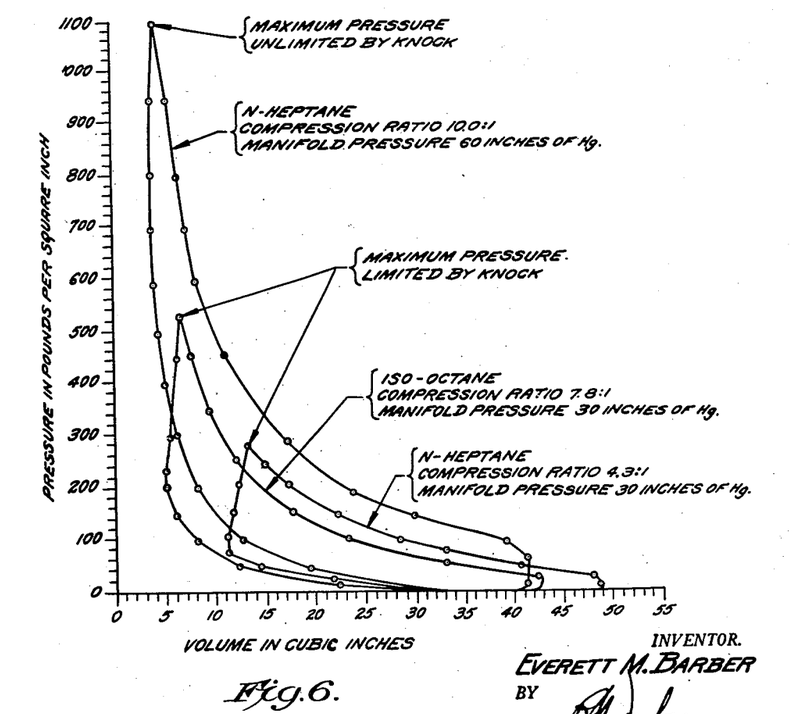
Fig. 6 shows a typical indicator diagram produced by the engine of the present invention superimposed on indicator dagrams of a conventional Otto cycle engine operating on two different fuels.

Fig. 3 shows a modification of the present invention which has functioned very satisfactorily in full scale operation and test. A standard C. F. R. engine having a 3¼" bore single cylinder was modified by installing an injection nozzle 20' so as to direct a fuel spray in a generally tangential direction of the combustion space, as indicated at 42. A spark plug 16' was positioned with its electrodes at substantially the periphery of the combustion space, the included angle 29' between the radii intersecting the tip of nozzle 20' and the center of plug 16' being approximately 45°. The engine was equipped with the usual exhaust valve 15' and an intake valve 14' having a 180° shroud 34' positioned with the ends of the shroud substantially on a radius of the combustion space to impart a swirling movement of the air within the combustion space as indicated by the arrows 33'. The proportioning of the valves as to size and location as illustrated in this figure is that customarily employed in a 3¼" bore cylinder. It will be understood that Figs. 1 and 2, as well as Figs. 5 and 6, are illustrated diagrammatically, and do not necessarily indicate the proportioning of the valves as to size and location. Ordinarily the valves are located with their centers lying on a diameter of the cylinder, and are of larger size in relation to the cylinder diameter than shown in Figs. 1, 2, 5, and 6. Since the conventional arrangement and proportioning of the valves as customarily employed in this art can be used, the diagrammatic showing has been used in these figures as a matter of convenience and particularly for clearness in illustration in Fig. 1.

In this modification, illustrated in Fig. 3 the injection equipment was such as to produce a penetrating core of atomized fuel particles 43 on the inner side toward the center of the combustion chamber, with a mist of very finely divided or atomized particles 44 at the outer side adjacent the cylinder wall. The surrounding mist vaporized rapidly and mixed with adjacent swirling air, which latter deflected a portion of the fuel vapor-air mixture indicated at 45 toward the electrodes of plug 16'. The plug was thus positioned within the surrounding core of combustible fuel vapor-air mixture, but was out of contact with any penetrating liquid fuel particles.

The operation of this form was similar to that previously described in that the spark at plug 16' was synchronized with the injection advance so as to fire the first increment of combustible fuel vapor-air mixture as it reached the plug. This initiated combustion establishing a flame front 38'.

While the preferred form of the invention is considered to be that described in connection with Fig. 2, wherein a uniform atomization and dispersion of the injected fuel across the spray pattern opposite the point of ignition is secured, it was found in the operation of the modification of Fig. 3 that uniform and finely divided atomization across the entire spray pattern was not essential in obtaining knock-free operation, although the combustion efficiency was somewhat impaired. Once having initiated combustion and established the flame front 38', the additional fuel injected toward the flame front mixed with additional swirling air and was consumed by combustion substantially as rapidly as combustible fuel vapor-air mixture was formed therefrom. The above description of the character and form of the spray applies to observations made with the injector equipment mounted on an injector test stand with the nozzle at atmospheric pressure and injecting into air at atmospheric temperature and pressure, where the spray form could be observed. However, in the actual operation of the engine, with this same injector running at a relatively high temperature, and injecting fuel into air at high pressure and temperature, it is probable that the so-called penetrating core was largely non-existent in the combustion space, or evident only as a streak or zone of richer mixture. In any event, with this injector equipment which produced the said nonuniform atomization across the spray on the test stand at atmospheric temperature and pressure, satisfactory operation without knocking of the engine was obtained. The desired no-knock operation was attained with fuels from less than 0 to more than 100 octane using compression ratios up to 10:1 and manifold pressures up to 112" of mercury absolute.

In the modifications described above employing directed movement of air or air swirl with a fixed locus of fuel injection, the air swirl performs several important functions. It removes products of combustion from the flame front 38 or 38' as fast as the combustible mixture is consumed, so that they are replaced by fresh combustible mixture and burning of the latter is accomplished without objectionable exhaust gas dilution. The directed movement of air also brings fresh quantities of air into the fuel impregnation zone to accomplish the uniform impregnation of that portion of the air which is consumed on each cycle. The combustion is thereby conducted with high combustion efficiency throughout the full period of injection on each cycle. In the forms of the invention illustrated in Figs. 1-3, where the spark plug is close to the nozzle tip and the tangential direction of injection is such as to bring an edge of the spray form closely adjacent the plug electrodes, the penetrative force of the jet is sufficient to carry the fuel to the vicinity of the spark plug; and the rapidly formed combustible fuel vapor-air mixture along the edge of the spray form diffuses outwardly into contact with the electrodes of the plug. However, the air swirl can be utilized to blow or divert fuel vapor-air mixture into contact with the electrodes of the spark plug to insure ignition, thereby avoiding direct impingement of unvaporized liquid fuel on these electrodes which would result in misfiring and even damping out of the plug.

While in the preferred embodiments described above, the fuel is injected tangentially in the direction of air swirl, this is not essential. For example, the fuel may be injected radially or across the air swirl, or it may be injected against the air swirl. Such modifications require a proper correlation of the fuel injection rate and spray pattern with the velocity of air swirl, the cylinder diameter, and the relative positioning of the fuel nozzle and spark plug, in accordance with the general principles set forth above. Thus, in these various modifications, the air swirl is utilized to blow combustible fuel vapor-air mixture into contact with the plug electrodes while avoiding direct impingement of liquid fuel particles thereon; and the injection advance is coordinated with the spark advance so that the first increment of injected fuel is fired as the resulting combustible fuel vapor-air mixture reaches the electrodes. The spray pattern is also modified to secure the desired uniform impregnation of the swirling air in accordance with the relative location of the nozzle and its direction of injection, and the fuel is injected in a narrow zone in advance of the flame front in its direction of relative movement with respect to the air swirl.

It has heretofore been proposed to inject atomized liquid fuel directly against the electrodes of an ignition device producing a high intensity arc which remains on during the full period of injection. In this prior arrangement, an arc of high tension and high energy similar to that used in nitrogen fixation furnaces was required to accomplish the stated purpose of combustion of the unvaporized fuel particles. The present invention is distinguished by the avoidance of direct impingement of unvaporized fuel particles on the electrodes of the spark plug, by the ability to use a conventional automotive ignition system producing the customary spark of comparatively lower intensity and short duration sufficient to ignite combustible fuel vapor-air mixture which first contacts the electrodes, and by the use of directional relative movement of the air with respect to the fuel during the period of injection and combustion.

As pointed out above, an important feature of the present invention is the proper synchronization of the spark advance with the injection advance to secure ignition of the first increment of injected fuel substantially as soon as that fuel has mixed with the air to form a combustible fuel vapor-air mixture, which latter is then present at and contacts the electrodes of the spark plug. Proper synchronization requires that a spark of igniting intensity be available at the time this first formed portion of combustible fuel vapor-air mixture reaches the spark plug, or very shortly thereafter. The timing of the beginning of the spark in relationship to the timing of the beginning of injection to accomplish this objective depends on:

(1) The time required for the fuel to travel from the injector to the spark plug, which in turn depends on the velocity of air swirl and/or the spray velocity as produced by the injector, and the included angle between the spray nozzle and the spark plug in relation to the cylinder diameter, which determines the absolute distance the fuel must travel between the nozzle and the spark plug; and (2) The time interval during which a spark of igniting potency remains present at the spark plug electrodes, which in turn depends upon the characteristics of the ignition circuit and the conditions at the spark plug gap.

The relationships included in (1) above have been discussed in detail in the foregoing. The variable under (2) above involves a consideration of the length of time a spark of igniting potency is produced at the plug electrodes on each cycle, namely, whether it is substantially instantaneous, or of a relatively short duration of the order of 5–20 crank angle degrees such as may be produced with conventional automotive ignition circuits, or whether it is of still longer duration which may approximate the time interval of the combustion phase.

While the present invention can be operated with a substantially instantaneous spark at the plug electrodes, this requires a critical coordination of the spark advance with the injection advance. For example, in the construction shown in Fig. 3 employing injection in the direction of air swirl, the instantaneous spark should occur at the plug electrodes at an instant within the range of about 4–10° and preferably about 6° of crank angle movement following the start of fuel injection. Where the injection is across or against the air swirl, then the spark advance is usually within the range of about 10–20° after the injection advance for the instantaneous spark.

However, it has been found that the conventional magneto or coil ignition system has a spark duration of about 5–30 crank angle degrees at an engine speed of 1800 R. P. M. It has further been found that not all of this spark duration is of sufficient intensity to ignite the mixture, the spark tolerance for a particular combustion chamber construction varying with the characteristics of the ignition system and the conditions at the spark plug gap employed. For example, with the construction shown in Fig. 3 and employing an ignition circuit of the magneto type having a spark duration of about 6 crank angle degrees with a plug gap of 0.005 inch, and decreasing to a spark duration of about 4° with a plug gap of 0.055 inch, the engine operated satisfactorily without knocking with the following settings of spark advance, using a 42° injection advance throughout the runs. With a spark duration of 6°, satisfactory operation occurred with an ignition advance setting from 40° to 33° B. T. C., thus giving a spark tolerance of about 7°. With a spark duration of about 4°, successful operation was secured with a spark advance setting varying between 37 and 33° B. T. C., providing a spark tolerance of about 4°.

In operation with another engine constructed similarly to Fig. 3, except that the spark plug center was moved in about ½ inch from the circumference of the combustion space and the included angle between radii intersecting the injection nozzle tip and the spark plug center was 30°, a different magneto ingnition circuit was employed having a much longer spark duration than in the previous example. Using a 60° injection advance throughout the series of runs, satisfactory knock-free operation was secured with an ignition advance of 70–54° B. T. C. for a spark duration of 28°, giving a spark tolerance of about 16°. With a larger plug gap providing a spark duration of about 24°, the operative spark advance range was 70–60° B. T. C., providing a spark tolerance of about 10°. With a still larger plug gap providing a spark duration of about 22°, the operative spark advance range was 63–54°, giving a spark tolerance at this setting of about 9°.

The above examples are given to illustrate that conventional automotive ignition circuits of the magneto type can be employed satisfactorily and will afford generally a spark tolerance of about 5–15°, depending upon the characteristics of the circuit and the size of the plug gap. Also, this is true of conventional ignition circuits of the coil and breaker type. Moreover, it is to be noted that with the conventional ignition system and the given engine construction described immediately above, the maximum spark advance could be set to precede the start of injection by as much as 10°, while the full retard setting of the spark advance could be set as much as 6° after the start of fuel injection, depending upon the size of the spark plug gap. In the above examples, the size of the plug gap was purposely varied simply as a convenient means of controlling and altering the duration of the spark. As a practical matter, the size of the spark gap in commercial engines may be set within rather close limits in accordance with conventional practice in the automotive ingition art, and may not be varied to any substantial extent. Therefore, the spark duration for a given ignition circuit will be fixed by the characteristics of that circuit, and the size of the spark gap may not be a variable. Consequently, the spark tolerance for a given engine construction and a given ignition circuit will be fixed; and the maximum spark advance and spark retard positions for the given set-up can be accurately determined and the spark setting made accordingly within these limits. It will be obvious from the above that, in general, the spark advance for the conventional automotive ignition system will be set in accordance with the present invention to approximately correspond with the injection advance or very shortly thereafter. The proper setting for any particular ignition circuit for a given engine construction can be readily determined by those skilled in the art in accordance with the principles set forth above, bearing in mind that a spark of ignitable intensity should be present at the plug electrodes at the time the first increment of injected fuel in the form of combustible fuel vapor-air mixture reaches the plug electrodes, or not more than about 5–15 crank angle degrees thereafter such that insufficient combustible fuel vapor-air mixture has accumulated in the combustion space at the time of ignition to permit knocking to occur. Investigation of various ignition circuits for this method of operation has indicated that a relatively high current spark is preferable.

While the conventional automotive ignition circuit functions very satisfactorily and provides a spark tolerance which removes the extreme criticality for exact setting of the spark advance in relation to the injection advance, it will be readily appreciated that a continuous spark of fairly long duration can be employed, if desired. While the continuous spark can be left on during the entire engine cycle, utilizing for example, a continuous type of spark employed in fuel burner systems, it is obvious that this arrangement can be easily synchronized with engine operation so that the spark is on only for a selected period of the combustion phase, and can be turned off during the balance of the cycle. Wherever the expressions "spark ignition" and "ignited by spark" or similar expressions appear in the description and claims, it is to be understood that these expressions include any of the arrangements described above for igniting the localized combustible fuel vapor-air mixture.

In addition to spark ignition as set forth above, other electrical igniting means, supplying electrical energy from an outside source, can be used to positively ignite the first increment of injected fuel as soon as combustible fuel vapor-air mixture is formed therefrom. For example, a glow plug or glow wire, connected in an electrical circuit containing an electromotive force sufficient to highly heat the plug or wire to a bright red or white heat, can be mounted in the engine cylinder in position to be contacted by the first formed increment of combustible mixture, in the manner set forth above for the mounting of the spark plug. This has been found to also positively effect ignition in the desired manner, even when starting the engine from cold or when idling. Such a glow plug or wire to which electrical energy is supplied from an outside source is to be distinguished from compression ignition, where no ignition device is employed, as well as hot bulbs used in semi-Diesels which receive their heat from the combustion taking place in the cylinder during running, even though they may be initially heated up outside for starting. In other words, the glow plug or wire must receive electrical energy even during periods of operation of the engine to produce the positive immediate ignition irrespective of the cetane or octane number of the fuel, which is essential to the successful non-knocking operation of the present invention. The expression "electrical ignition" is employed herein to generically cover the various forms of spark and glow plug or wire ignition described above and wherein electrical energy is supplied from an outside source to secure the required positive ignition promptly after the start of fuel injection on each cycle. Ordinarily, spark ignition is preferred as providing more efficient operation with higher power output. However, the glow plug or wire ignition has advantageous application where freedom from electrical interference with radio or radar reception is a prime consideration, such as in airplane motors.

While the operations described above, employing orderly and directed movement of air within the combustion space past a fixed locus of fuel injection, are considered preferred embodiments for carrying out the no knock method of operation of the present invention, it is to be understood that the invention is not limited thereto. In order to obtain the desired relative movement between the air and injected fuel during the combustion phase, the modifications of Figs. 4 and 5 may be used, wherein the locus of fuel injection is progressively moved in an orderly manner throughout the combustion space to bring different increments of the fuel into mixture with relatively stationary or non-directed turbulent air.

Figure 4:
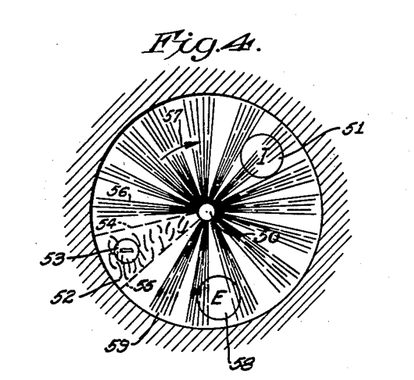
Fig. 4 is a horizontal view similar to Fig. 2 and represents another modification.

Fig. 4 shows a modification in which the fuel injection system and other appurtenances of the engine may be the same as for Figures 1-3, described above, except that in this case the fuel injection nozzle 50 is positioned centrally of the cylinder or combustion space. Air is introduced through a conventional intake valve 51 which may be a simple poppet valve, not provided with a shroud or other means for producing swirl of the air. The injection nozzle is provided with a plurality of circumferentially arranged ports through which fuel is injected in narrow bands or jets in spaced order and in sequence throughout the period of injection.

As indicated, fuel is first injected into the narrow or localized zone 52, where at least a portion of it flash vaporizes and mixes with the air in that particular zone to form a combustible fuel-air mixture adjacent the electrodes of the spark plug 53. This is immediately fired by the spark plug establishing flame fronts on opposite sides of the narrow band, as indicated at 54 and 55. Immediately thereafter a second quantity of fuel is injected from the next adjacent port to form an adjacent body of fuel mixture 56 which is immediately ignited by the flame front 54. In rapid and regular sequence, fuel is injected from the additional spaced ports into narrow adjacent zones proceeding around the combustion space, so that the flame front travels in the direction of the arrow 57. It is thus seen that fuel is injected in narrow bands immediately in advance of the flame front, and the resulting fuel mixture is immediately consumed by combustion before the fuel has an opportunity to mix with air other than in its localized zone. Consequently, the combustible fuel mixture in each of the series of localized zones is at all times surrounded and cushioned by incombustible gas, either air or products of combustion. Here again, the formation of trapped end gas consisting of combustible fuel mixture is entirely avoided so that the problem of knock is eliminated.

The amount of fuel injected, depending upon the power required, can be regulated by the number of ports throughout the circumference of the injection nozzle through which fuel is injected on each cycle. The upper limit is, of course, injection through all of the ports so as to substantially consume all of the air within the cylinder. Any conventional valve control for circumferentially arranged ports can be employed to regulate the fuel injection, such, for example, as a cam-operated sleeve valve sliding over a circumferentially arranged series of ports which are also spaced in the direction of sliding of the sleeve, in the manner of a spiral staircase. Control of the amount of fuel injected on each cycle is secured by regulation of the length of sliding travel of the sleeve valve and control of the time of fuel injection or injection advance is secured by regulation of the cam setting in relation to the engine stroke, all in conventional manner. Following expansion of the combustion gases, the products of combustion are discharged through the exhaust valve 58 and the cycle is repeated.

Instead of having the flame front travel in only one direction about the combustion space in the manner described above, the two separate flame fronts 54 and 55 can both be caused to travel in opposite directions. This is accomplished by controlled injection of fuel from pairs of ports arranged on opposite sides of the initial localized combustion zone 52, or in advance of the two flame fronts as they move about the combustion space. Thus, fuel is first injected into the localized zone 52. Immediately thereafter, two jets of fuel are injected simultaneously, or in extremely close sequence, into the zones 56 and 59, and this sequence of injection is continued while the two flame fronts move in opposite directions about the combustion space until the air is substantially all consumed or the power required has been obtained. In this case, the fuel injection ports of the nozzle are arranged to descend in two series of spiral staircases extending in opposite directions from the initial port, and under the control of the sliding sleeve valve previously described.

Figure 7:
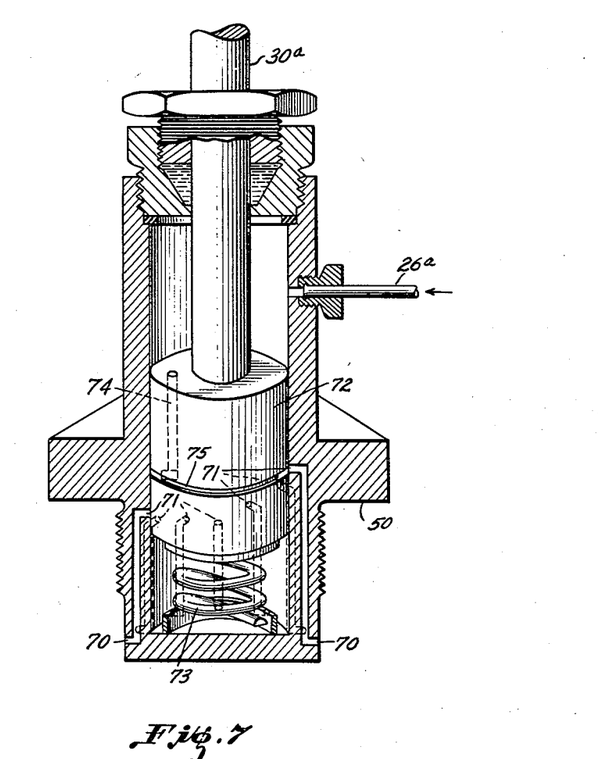
Fig. 7 is a sectional perspective view of a suitable nozzle construction for use in the modifications of Figs. 4 and 5.

Fig. 7 illustrates a typical nozzle construction for accomplishing the injection of fuel in narrow bands and in sequence, as described above. The tip of the centrally arranged nozzle 50 of Fig. 4 is provided with the plurality of circumferentially arranged discharge ports 70 which communicate through channels formed in the nozzle body with the circumferentially arranged ports 71 opening into the interior of the nozzle body. The latter ports are controlled by the sleeve or piston valve 72 connected to valve stem 30ª actuated by cam 31 (Fig. 1) against the compression of spring 73. Fuel supplied by pump 23 (Fig. 1) passes by line 26ª to the interior of the nozzle and thence by drilled passage 74 having a lower radial extension to the annular channel 75 formed about the circumference of the valve 72. As shown in Fig. 7, channel 75 is in registration with the uppermost port 71 which provides the initial radial band of injected fuel 52 (Fig. 4) in the combustion space at the start of a fuel injection cycle. Thereafter, as the cam 31 forces the valve 72 downwardly on that injection cycle, the annular channel 75 comes into registration in sequence with other ports 71 which are spaced in the direction of sliding movement of the valve, to thereby produce the sequence of narrow fuel bands leading the flame front around the combustion space as previously described. In the first discussed modification of Fig. 4, where a single flame front can swing entirely around the combustion space, it will be understood that the ports 71 spaced circumferentially around the half of the nozzle body which is cut away in the sectional view of Fig. 7, continue to descend in spiral staircase fashion so that they are brought into registration with channel 75 in sequence upon further descending movement of valve 72 beyond its position for registration with the lowest port 71 shown at the left-hand side of Fig. 7. In the second modification of Fig. 4, where two flame fronts simultaneously swing about the combustion space in opposite directions from the initial band 52, it will be understood that the ports 71 spaced circumferentially about the half of the nozzle body which is cut away in the sectional view of Fig. 7, are directly opposite and at the same vertical elevations as the ports 71 shown in dotted lines in this figure, thus providing the two series of spiral staircases extending in opposite directions from the initial port 71 shown at the right-hand side of Fig. 7 and terminating at the lowermost port 71 shown at the left-hand side of this figure.

Fig. 5 shows still another modification in which the fuel nozzle 60 is positioned at one side of the cylinder and is provided with a plurality of spaced ports for injecting localized fuel streams in sequence over spaced portions of the combustion space. Fuel is first injected into the zone 61 where it is immediately ignited by spark plug 62. Fuel is then immediately injected from the second port into the localized zone 63 in advance of the flame front 64 established by combustion in zone 61. Thereafter, fuel is injected in rapid sequence from the other ports, causing localized combustion throughout the other segments of the combustion space in order, and resulting in movement of the flame front about the fuel nozzle as an axis in the direction of the arrow 65 until either all the air has been consumed or sufficient fuel has been injected for the power required. If desired, a second spark plug 67 can be employed for simultaneously, or substantially simultaneously, initiating combustion in localized zone 68 with the combustion in zone 61. The flame fronts 64 and 69 then rotate about the fuel nozzle as an axis toward each other. The sequence of fuel injection from the spaced ports of the nozzle can be controlled in any conventional manner, such as by the arrangement of sleeve valve of Fig. 7 described above in connection with Fig. 4. In the nozzle 60 for Fig. 5, it will be understood that the circumferentially arranged ports 70 and 71 of Fig. 7 extend somewhat less than halfway around the nozzle tip and body respectively on the side that faces or protrudes into the combustion space; and the ports 71 are arranged in a single spiral staircase for the first modification having a single flame front. In the second modification having two flame fronts, it will be understood that two spiral staircases of ports 71 starting from two uppermost ports at the opposite sides of the protruding face of the nozzle body, extend downwardly around the nozzle body and toward each other, terminating in a single lowermost port 71 lying on the diameter of the combustion space passing through the nozzle axis as shown in Fig. 5. In both Figs. 4 and 5 the quantity of fuel injected can be regulated by the setting of the cam through any suitable external control, and the injection advance can be regulated by the setting of the cam through suitable external or automatic control, as is well understood. While the use of a disc-shaped combustion space in the modifications of Figs. 4 and 5 is preferred, this is not critical as it is in the modifications of Figs. 1-3 where swirling air is employed. Thus, where the locus of fuel injection is moved in an orderly manner about the combustion space during the injection period, the combustion space may be non-circular in cross-section; and the penetration of the succeeding bands of fuel can be controlled or varied, as by varying the length to diameter ratio of the orifices, to accord with the distance each band should travel from its locus to reach or approach the opposite wall of the combustion space.

Fig. 6 shows a typical pressure-volume indicator diagram ABC obtained on a 3¼" bore single cylinder C. F. R. engine modified to include the features of the present invention as described above and illustrated in Figs. 1-3. This diagram was obtained with a 10:1 compression ratio, 60" of mercury absolute manifold pressure, and on normal heptane of zero C. F. R. M. octane as the fuel. No evidence of knock was obtained in this run. It is apparent that higher compression ratios or higher boost pressures, or both, can be employed with engines properly designed with respect to piston and cylinder head clearance, so as to secure even greater specific output or power.

Superimposed on Fig. 6 is the pressure-volume indicator diagram of the same engine for normal Otto cycle operation as originally designed, utilizing normal heptane as the fuel and employing zero boost pressure with the maximum compression ratio to obtain incipient knock. This diagram is indicated by DEF and was obtained at approximately 4.3:1 compression ratio.

Also shown on Fig. 6 is the pressure-volume indicator diagram GHJ of the same engine utilizing iso-octane of 100 C. F. R. M. octane number as the fuel, and operating with the conventional Otto cycle with zero boost pressure and incipient knocking at a 7.8:1 compression ratio.

As evident from the diagram ABC of Fig. 6, the engine was operated at this time on the Otto cycle. As herein used in reference to the fuel injection-spark ignition knock-free method of the present invention, "Otto cycle" means introduction of air, adiabatic compression, fuel injection with combustion at approximately constant volume, adiabatic expansion, and exhaust. By varying the fuel injection rate, the engine of this invention can operate on the "Diesel cycle," meaning introduction of air, adiabatic compression, fuel injection with combustion at approximately constant pressure, adiabatic expansion, and exhaust. Since the rate of fuel injection controls the rate of combustion and consequently the pressure rise within the cylinder in relation to the engine cycle, the engine of this invention can also be operated on a cycle intermediate the said Otto cycle and the said Diesel cycle as defined above. In view of the inherently higher cycle efficiency of the Otto cycle as compared to the Diesel cycle, it is generally preferred to operate the engine of the present invention on the Otto cycle, or a cycle approaching combustion at approximately constant volume. Moreover, it is generally preferred to operate this engine at a compression ratio at about 9:1 to 10:1 to obtain the inherent increase in the Otto cycle efficiency resulting from the higher compression ratio, while at the same time avoiding the necessary increase in cost, size, and weight of the engine that is involved in Diesel engine construction for operation at compression ratios of about 14:1 to 16:1.

The engine of the present invention combines the desirable features of the typical Otto or automotive engine operating on preformed or carbureted fuel mixture with spark ignition, and the typical Diesel engine operating with fuel injection and spontaneous ignition. Thus, the present engine approximately equals the high power developing characteristics of the Otto engine for a given compression ratio, while at the same time avoiding the relatively higher specific fuel consumption at lower power of the Otto engine and approaching the low specific fuel consumption of the Diesel engine. At the lower and intermediate speeds or loads of the present engine, only a portion of the air within the cylinder is impregnated with fuel on each cycle. While the impregnated portion has a fuel-air ratio of about 0.06–0.08 for high combustion efficiency, the overall ratio of fuel to air on each cycle may be considerably below 0.06. This means that the overall operation of the present engine under variable speed and load conditions may give an average overall fuel-air ratio of about 0.03–0.04 with resultant greatly improved specific fuel consumption over the Otto engine. The present engine develops considerably more power than the Diesel engine for a given compression ratio. Since the present engine operates with spark ignition, it does not require the expensive and massive construction of the Diesel engine necessitated by the very high compression ratios for spontaneous ignition. At the same time the present engine can utilize, without change in structural strength, size, weight and cost of the conventional Otto engine, compression ratios which are substantially higher than those now permitted for the Otto engine due to the limitations of fuel quality with resultant knocking of the latter. Finally, the engine of the present invention has a very important advantage in the matter of fuel cost over both the Otto engine and the Diesel engine, since it does not require a special fuel of high octane number as conventionally used by the Otto engine, and does not require a special fuel of high cetane number as commonly used by the Diesel engine.

While the invention has been described above as applied to four-cycle operation, it is to be understood that the invention is also applicable to two-cycle operation; in fact, the invention lends itself particularly well to two-cycle operation because there is no necessity for preforming the fuel mixture, and this enables the suction stroke of four-cycle operation to be easily eliminated. For example, a two-cycle engine may be equipped with air intake ports for directional introduction of the air just above the bottom of piston travel whereby a swirling movement of the air can be imparted, as discussed above in connection with Figs. 1–3. Poppet exhaust valves may be provided at the opposite end of the cylinder for discharge of the exhaust gases. The method of operation, and suitable constructions of two-cycle engines, for attaining the non-knocking combustion described herein, as well as securing satisfactory operation on the Otto cycle for high speed engines while overcoming the heretofore unsolved difficulties of pre-ignition of the preformed charge from the core of combustion products as well as poor scavenging at light loads with resultant inefficient operation and uncertain control, are disclosed and claimed in my copending application Serial No. 11,577 filed February 27, 1948.

By way of example, data obtained in runs employing the present invention on a C. F. R. engine which had been modified to incorporate the essential features of Figs. 1–3, and was directly connected to a General Electric TLC 15 dynamometer, are listed hereinbelow. The conditions for the runs immediately following were as follows:

TABLE I

| | | |
|---|---|---|
| Engine speed | R. P. M. | 1800 |
| Compression ratio | | 10:1 |
| Spark advance | | 35° |
| Injection advance | | Abt. 42° |
| Injector opening pressure | lbs./sq. in. | 2000 |
| Intake air temperature | °F. | 90 |
| Jacket temperature | °F. | 212 |
| Dynamometer constant | | 4080 |
| Friction scale pull | lbs. | 14.2 |

Under the conditions specified immediately above, the following results were obtained, operating with the various manifold pressures and rates of fuel flow as indicated, and utilizing the two different fuels specified:

TABLE II

Running on normal heptane of zero C. F. R. M. octane

| | | | | |
|---|---|---|---|---|
| Manifold pressure, inches of mercury absolute | 72 | 72 | 72 | 79 |
| Fuel flow rate, time in seconds for 50 cc. of fuel | 76.8 | 56.2 | 39.4 | 24.0 |
| Net brake pull on dynamometer in lbs. | 9.7 | 14.5 | 21.7 | 32.5 |
| Indicated horsepower | 10.7 | 12.8 | 16.0 | 20.7 |
| Indicated mean effective pressure, lbs./sq. in. | 124 | 149 | 186 | 240 |
| Specific fuel consumption in lbs. of fuel per indicated horsepower-hour | 0.33 | 0.38 | 0.43 | 0.55 |

Running on iso-octane of 100 C. F. R. M. octane

| | | | | |
|---|---|---|---|---|
| Manifold pressure, inches of mercury absolute | 72 | 72 | 72 | 72 |
| Fuel flow rate, time in seconds for 50 cc. of fuel | 71.4 | 49.6 | 30.8 | 22.0 |
| Net brake pull on dynamometer in lbs. | 6.2 | 14.0 | 22.7 | 27.2 |
| Indicated horsepower | 9.1 | 12.4 | 16.8 | 18.8 |
| Indicated mean effective pressure, lbs./sq. in. | 106 | 144 | 195 | 218 |
| Specific fuel consumption in lbs. of fuel per indicated horsepower-hour | 0.42 | 0.44 | 0.53 | 0.66 |

In all of the runs listed above, satisfactory operation without knocking was secured. These results show that engine operation does not depend on the octane number of the fuel.

The following run was carried out on a blend of iso-octane with Michigan straight-run gasoline, the blend having a C. F. R. M. octane of 90, This run was made on the same modified C. F. R. engine under the following conditions:

TABLE III

| | |
|---|---|
| Compression ratio | 7:1 |
| Spark advance | 18° |
| Injection advance | 25° |
| Injector opening pressure lbs./sq. in. | 1200 |
| Intake air temperature °F | 90 |
| Jacket temperature °F | 212 |
| Dynamometer constant | 4080 |
| Friction scale pull lbs. | 15 |
| R. P. M. of engine | 1800 |
| Manifold pressure, inches of mercury absolute | 70 |

Under these conditions, the following results were obtained:

TABLE IV

| | |
|---|---|
| Net brake pull on dynamometer in lbs. | 18.5 |
| Indicated horsepower | 14.8 |
| Indicated mean effective pressure, lbs./sq. in. | 171 |

This run shows that the engine can be operated at reduced compression ratio similar to the highest compression ratio now employed in automotive engines, and does not necessarily have to operate at excessive compression ratios to provide advantageous results. In the above run, higher I. M. E. P. was obtained on the 90 octane fuel than is normally secured at the same compression ratio with the conventional Otto cycle engine operating on iso-octane plus 1 cc. of tetraethyl lead.

The engine was also run at this lower compression ratio and with lower manifold pressures down to an absolute manifold pressure of 20 inches of mercury, that is, 10 inches below atmospheric pressure. In fact, the engine will operate very satisfactorily at compression ratios as low as 4:1. On the other hand, the only apparent limitations to further increasing the compression ratio involve structural considerations of piston and cylinder head clearance and valve operation, structural strength and cooling; and the only apparent limitations to further increasing the manifold pressure involve considerations of supercharger pressure obtainable, the power available to run the supercharger, and structural strength.

To demonstrate the power obtainable, the following runs were made on the same modified C. F. R. engine utilizing a Michigan straight-run gasoline having a C. F. R. M. octane of 20 as the fuel, and employing the following conditions:

TABLE V

| | |
|---|---|
| Compression ratio | 10:1 |
| Spark advance | 40° |
| Injection advance | 50° |
| Injector opening pressure lbs./sq. in. | 2000 |
| Intake air temperature °F | 90 |
| Jacket temperature °F | 212 |
| Dynamometer constant | 4080 |

The following results were obtained at the listed engine R. P. M. with the various manifold pressures and fuel flow rates as shown:

TABLE VI

| Engine R. P. M. | 2400 | 1800 | 1500 |
|---|---|---|---|
| Friction scale pull in lbs. | 20 | 17 | 15 |
| Manifold pressure, inches of mercury absolute | 86 | 96 | 102 |
| Fuel flow rate, seconds per 50 cc. | 13.5 | 16.8 | --- |
| Net brake pull on dynamometer in lbs. | 35 | 42 | 64 |
| Indicated horsepower | 32.4 | 26.0 | 23.6 |
| Indicated mean effective pressure, lbs./in.² | 284 | 300 | 330 |
| Specific fuel consumption, lbs. of fuel per indicated horsepower-hour | 0.63 | 0.63 | --- |

The following run was made under the same conditions as listed above in Table V except that the spark advance was 15° and the injection advance 25°. The results obtained and the other conditions of operation were:

TABLE VII

| | |
|---|---|
| Engine R. P. M. | 1800 |
| Friction scale pull in pounds | 20 |
| Manifold pressure, inches of mercury absolute | 112 |
| Net brake pull on dynamometer in lbs. | 64 |
| Indicated horsepower | 28.3 |
| Indicated mean effective pressure, lbs./in.² | 328 |

The following table illustrates typical performance characteristics obtained on the said modified C. F. R. engine under conditions of lower or intermediate power and lower manifold pressure. The conditions of the runs of this series were as follows:

TABLE VIII

| | |
|---|---|
| Compression ratio | 10:1 |
| Injection advance | 40° |
| Injector opening pressure lbs./sq. in. | 3000 |
| Intake air temperature | 90° |
| C. F. R. M. octane of fuel | 24 |
| Manifold pressure, inches of mercury absolute | 30 |

Under the above conditions the following results were obtained:

TABLE IX

| Indicated Mean Effective Pressure, lbs./in.² | Fuel-Air Ratio | Specific—Fuel Consumption-pounds of fuel per indicated horsepower-hour |
|---|---|---|
| 32 | 0.012 | 0.32 |
| 44 | 0.02 | 0.33 |
| 75 | 0.033 | 0.34 |
| 90 | 0.043 | 0.37 |
| 104 | 0.057 | 0.43 |
| 111 | 0.07 | 0.49 |
| 121 | 0.11 | 0.65 |

It should be noted that the C. F. R. engine used in all of the above-listed runs has a rated horsepower of about 5. All of the above runs were successfully made without knock. The indicated mean effective pressure of about 330 pounds per square inch of Tables VI and VII represents about a 37½ per cent increase in power over the best runs previously made on an unmodified C. F. R. engine operating on iso-octane plus six cc. of tetraethyl lead and utilizing the conventional Otto cycle with preformed fuel mixture at incipient knocking conditions with specific fuel consumption of 0.75.

It is readily apparent that these runs do not represent the maximum power obtainable, since further increase in compression ratio and further increase in manifold pressure with properly designed equipment can be employed in engines utilizing the present invention. It is thought that the limitations on power or specific output of the present engine reside largely in the ability to extract heat from the cylinder and combustion space to avoid injury to engine parts, since the previous limitations of knock and pre-ignition have been removed.

The specific fuel consumption of about 0.33 obtained in the runs listed in Tables II and IX indicates that the present invention is adaptable to automotive engines to provide greatly increased fuel economy. On the basis of comparative specific fuel consumption figures, it is indicated that an increase in mileage per gallon of fuel of as much as 20% can be obtained for many of the popular makes of automobiles now on the market.

The greatly increased specific output or power obtainable indicates the adaptability of the present invention to airplane engines to provide increased power on take-off and for maneuvers, while at the same time affording good fuel economy at cruising speed and a greater cruising radius.

The engine of the present invention has been satisfactorily operated on a wide variety of fuels of varying characteristics and volatilities including gasolines from about 20 to over 100 C. F. R. M. octane, normal heptane, isopentane, isooctane, cetane, alpha-beta-methyl naphthalene, kerosene, benzol, Diesel fuel or gas oil, methyl alcohol, and even light lubricating oil. All fuels lighter than gas oil operated very satisfactorily without employing the heater 28 for preheating the fuel passed through the fuel line to the injection nozzle. The heavier and viscous fuels of the character of light lubricating oil required preheating to about 300-500° F. for satisfactory knock-free operation. These runs show that the engine of the present invention will satisfactorily run on fuels of a much wider range of volatility than either the conventional Otto engine or the Diesel engine. In addition to the liquid fuels, normally gaseous fuels of the character of butane can also be employed, preferably utilizing sufficient pump pressure to maintain the fuel liquefied in the lines leading to the injection nozzle, while obtaining flash vaporization at the time of fuel injection. In view of the fact that the present engine is not critical of the front end volatility or the boiling distribution range of the fuel, and operates satisfactorily irrespective of the octane or cetane number of the fuel, it is apparent that the present invention opens up a wide variety of fuels for internal combustion engine use. The essential requirements of the fuel are that it should be clean to avoid deposits and clogging of the fuel lines and nozzles, non-corrosive, and properly combustible when mixed with air in the proper proportion. From the standpoint of economy and availability, a broad boiling range petroleum distillate of relatively low octane, such as a fraction boiling from about 100 to 500° F. and produced without special and expensive processing, constitutes a very satisfactory fuel for the present engine.

While the invention in its simplest form dispenses with the conventional carburetors and manifolds of present-day engines, it is to be understood that a system of carburetion can also be employed in conjunction with the fuel injection system of the present invention, provided the initial carbureted fuel vapor-air mixture drawn into the engine cylinder contains insufficient fuel to support combustion.

While the invention as described above may be employed in an engine which throttles the air introduced into the cylinder or cylinders on each cycle in accordance with the power required, there is no necessity for such a control of the air supply; and it is advantageous to operate with a full charge of air in the cylinder on each cycle irrespective of the power requirement. As set forth above, control of the combustion and power developed is regulated by the quantity of fuel injected. Since the fuel is injected into localized portions of the air within the combustion space, efficient combustible mixtures are formed irrespective of the total quantity of air within the cylinder. Moreover, at reduced power requirements, where all of the air within the cylinder is not consumed, the excess air functions to absorb excess heat of the combustion and this, coupled with the latent heat of vaporization of the injected fuel, reduces the requirements for heat extraction imposed on the cooling system. Elimination of the air throttle valve and control equipment also simplifies engine construction. Further, elimination of air throttling also insures maximum air charge under all conditions, whether at atmospheric or high boost pressures, so that there is no delay or lag upon acceleration, or when heavy load is applied and maximum power required. In the modifications where swirling air is employed, a "skin effect" is noticeable which decreases the cooling system requirements of the engine. Thus, a thin layer at the periphery of the swirling air mass immediately adjacent the cylinder wall appears to remain non-combustible on each cycle, and serves to heat insulate the metal of the cylinder wall from the flaming products of combustion. A higher proportion of the generated heat is thereby expelled through the exhaust and a lower proportion is transferred through the cylinder wall for equal power, in comparison to conventional Otto cycle engines, with the net result that a smaller capacity cooling system for an engine of equivalent power can be used with the present invention.

In addition to the advantages set forth above involving the elimination of knock and pre-ignition, increase in power, and decrease in fuel consumption for the same power, it should be pointed out that the present invention also affords additional advantages in ease of starting in extreme cold and elimination of vapor lock difficulties. Where difficulty is encountered in starting in extreme cold, the heater 28 can of course be employed to preheat the fuel.

The present invention is to be distinguished from fuel injection engines operating with spark ignition and with relatively low compression ratios as heretofore proposed, such as the Hesselman engine. In the latter, the fuel is all or substantially all introduced prior to ignition. The ignition preferably follows the end of injection, or in certain instances for full load may occur just before or concurrently with the end of injection. Moreover, there is no instantaneous ignition of the first increment of injected fuel as soon as it forms a combustible fuel vapor-air mixture; and there is no continued subsequent injection of additional fuel into a narrow zone or zones immediately in advance of the flame front, with cushioning on both sides by incombustible air or gas, as in the present invention. In these prior engines, the problems of knock and pre-ignition are retained.

Obviously many modifications and variations of the invention, as hereinbefore set forth, may be made without departing from the spirit and scope thereof, and therefore only such limitations should be imposed as are indicated in the appended claims.

I claim:

1. The method in the operation of an internal combustion engine having a power cylinder providing a combustion space as herein defined, which comprises introducing air unmixed with sufficient fuel to support combustion into the said power cylinder combustion space, compressing said air therein, injecting prior to top dead center of the compression stroke fuel into a localized portion of said compressed air within the said combustion space at a temperature and pressure such that at least a portion thereof rapidly vaporizes and forms with the localized portion of the compressed air a combustible fuel vapor-air mixture with only a short travel of the fuel from the locus of injection, immediately electrically igniting the localized first increment of combustible fuel vapor-air mixture substantially as soon as formed and before sufficient fuel has been injected and has had an opportunity to disseminate more widely throughout the combustion space to produce knock, whereby the localized combustible fuel vapor-air mixture burns and establishes a flame front traveling with respect to the air within the combustion space and which is confined on the rear side by resulting combustion products and on the front side by a layer of incombustible gas, and continuing the injection of fuel into a narrow zone of said combustion space containing compressed air shortly in advance of the flame front in its direction of movement while moving the compressed air and locus of fuel injection relatively to each other in an orderly manner to progressively form additional localized portions of combustible fuel vapor-air mixture immediately in advance of the traveling flame front so that they are ignited by said flame front and burned substantially as soon as formed, while maintaining the said confining layer of combustion products at the rear and the confining layer of incombustible gas at the front, whereby the formation of sufficient highly heated end gases consisting of unburned combustible fuel vapor-air mixture trapped by the flame front and which ultimately may undergo spontaneous ignition and produce knock is eliminated.

2. The method in the operation of an internal combustion engine of the character described, which comprises forming a mass of compressed swirling air rotating at high velocity within a disc-shaped combustion space of the engine, injecting fuel into said compressed swirling air so as to substantially uniformly impregnate a localized segment of the swirling air with fuel as it rotates past the locus of fuel injection, promptly electrically igniting the first increment of injected fuel at a point near to the locus of fuel injection and substantially as soon as combustible fuel vapor-air mixture has formed therefrom to establish a flame front traveling in the opposite direction to said air swirl, the resulting combustion products rotating away from the flame front, as fresh compressed air rotates toward the flame front, whereby the traveling flame front is confined on its rear side by a layer of said combustion products and on its front side by a layer of incombustible gas, and continuing the injection of fuel into a localized portion of said fresh compressed air immediately in advance of the traveling flame front to progressively form additional combustible fuel vapor-air mixture which is immediately ignited by the traveling flame front and burned substantially as rapidly as formed, while maintaining the flame front confined by said incombustible layers, whereby spontaneous combustion and resulting knock are prevented.

3. The method according to claim 2, wherein the fuel is injected in the form of a flattened fan-shaped spray pattern tangentially of the combustion space in the direction of air swirl, the outer edge of the fan-shaped spray being close to but removed from the wall of the combustion space so as to avoid direct impingement of liquid fuel particles thereon, and the inner edge of the fan-shaped spray being spaced from the center of the combustion space, the outer edge of the spray being more highly atomized than the inner portion therein to vaporize rapidly to produce the combustible fuel vapor-air mixture which comes into ignitible contact with the point of ignition adjacent the wall of the combustion space with a travel of less than 90 angular degrees from the locus of injection.

4. The method according to claim 2, wherein the fuel injection rate and spray pattern are coordinated with the velocity of air swirl to uniformly impregnate the portion of the air consumed on each cycle at a relatively lean fuel-air ratio at light loads up to an intermediate load at which substantially all the air is impregnated at said lean ratio, and increasing the injection rate to impregnate the air at a richer fuel-air ratio for loads above said intermediate load.

5. The method according to claim 2, wherein the fuel is injected from adjacent the wall of the combustion space generally tangentially of the combustion space in the direction of air swirl and in the form of a spray having a penetrating core on the air up-stream side and toward the center of the combustion space, and a soft mist on the air down-stream side of the spray and adjacent to the wall of the combustion space, the said mist forming the combustible fuel vapor-air mixture which comes into ignitible contact with the point of ignition.

6. The method in the operation of an internal combustion engine having a power cylinder providing a disc-shaped combustion space as herein defined which comprises introducing air unmixed with sufficient fuel to support combustion into said combustion space, compressing said air without imparting directed movement thereto, injecting fuel from a central locus of injection radially of the disc-shaped combustion space into said comparatively stationary compressed air in a single narrow band and at a temperature and pressure such that at least a portion of the fuel vaporizes rapidly and forms a localized segment of combustible fuel vapor-air mixture in said narrow band, immediately spark igniting said narrow band of combustible fuel vapor-air mixture before the fuel vapor has an opportunity to disseminate and mix more widely with the air in said combustion space to establish a traveling flame front, and then injecting additional fuel in narrow radial bands and in sequence around the combustion space until sufficient fuel has been introduced for the power required, each narrow band of fuel being injected immediately in advance of the traveling flame front formed by the combustion of the localized combustible fuel vapor-air mixture formed from the previous fuel injection band, so that each subsequent localized fuel vapor-air mixture is ignited by the flame front of the previous band and burned substantially as soon as formed and the flame front rotates around the disc-shaped combustion space, the combustion being thereby accomplished without the formation of sufficient highly heated end gases consisting of combustible fuel vapor-air mixture trapped by the flame front to undergo spontaneous ignition and produce knock.

7. The method according to claim 6, wherein fuel is injected in narrow bands adjacent opposite sides of the initially produced and ignited band of combustible fuel vapor-air mixture, and this injection is continued in sequence whereby two flame fronts are established and rotate about the disc-shaped combustion chamber in opposite directions.

8. The method in the operation of an internal combustion engine having a power cylinder providing a disc-shaped combustion space as herein defined, which comprises introducing air unmixed with sufficient fuel to support combustion into said combustion space, compressing said air without imparting directed movement thereto, injecting fuel from a locus of injection adjacent the cylinder wall in a narrow band across a small segment of the disc-shaped combustion space adjacent the periphery thereof and into said relatively stationary compressed air, the fuel being at such a temperature and pressure that at least a portion thereof vaporizes rapidly and forms a localized segment of combustible fuel vapor-air mixture, promptly spark igniting said localized combustible fuel vapor-air mixture before the fuel vapor has an opportunity to disseminate and mix more widely with the air in the combustion space, whereby a chord of traveling flame front is established extending from the point of fuel injection as an axis, and continuing the injection of fuel in narrow bands and in sequence immediately in advance of the flame front, so that each subsequent band of combustible fuel vapor-air mixture is ignited by the flame front from the previous band and the flame front swings through the combustion space about the point of fuel injection as an axis, the operation being such that combustion of each narrow zone of combustible fuel vapor-air mixture is accomplished while maintaining such narrow zone surrounded by a cushioning layer of incombustible gas, and without the formation of sufficient highly heated end gases consisting of combustible fuel vapor-air mixture trapped by the flame front to undergo spontaneous ignition and produce knock.

9. The method according to claim 8, wherein fuel is initially injected in two narrow bands forming localized segments of combustible fuel vapor-air mixture extending in opposite directions from the locus of injection, both segments being promptly ignited to establish two traveling flame fronts, and injection of fuel is then continued in narrow bands and in sequence immediately in advance of the two traveling flame fronts thus established, whereby the two flame fronts swing through the combustion space in opposite directions and toward each other about the locus of injection as an axis.

10. An internal combustion engine of the character described, comprising a power cylinder having a combustion space as herein defined, air intake means for said cylinder, a piston operating therein adapted to compress the air within said combustion space on the compression stroke, fuel injection means for introducing atomized fuel into the compressed air within said combustion space, electrical ignition means positioned within said combustion space to ignite the first increment of injected fuel as soon as combustible fuel vapor-air mixture is formed therefrom to establish a flame front traveling with respect to the compressed air within said combustion space, and means for moving the air and locus of fuel injection relatively to each other in an orderly manner within said combustion space during the balance of the period of fuel injection to uniformly and progressively impregnate with fuel additional quantities of the air immediately in advance of the traveling flame front in its direction of movement, whereby additional quantities of combustible fuel vapor-air mixture are progressively formed, ignited by the traveling flame front and burned substantially as rapidly as formed, and the accumulation of substantial masses of end gases consisting of unburned combustible fuel vapor-air mixture such as to cause spontaneous ignition and product knock is prevented.

11. An internal combustion engine in accordance with claim 10, wherein the said cylinder and piston are constructed so that the piston compresses the air within said combustion space without imparting directed movement thereto, the fuel injection means is mounted axially of the combustion space to inject a first increment of fuel radially of the said combustion space in a single narrow band, the electrical ignition means is positioned between the fuel injection means and the cylinder wall closely adjacent the first band of injected fuel to ignite the latter and produce a flame front, and the said fuel injection means is constructed to continue the injection of fuel in narrow radial bands in sequence immediately in advance of the flame front so that each subsequent band of combustible fuel vapor-air mixture is ignited by the flame front from the previous band and the flame front rotates through the combustion space about the point of fuel injection as an axis.

12. An internal combustion engine in accordance with claim 10, wherein the said cylinder and piston are constructed so that the piston compresses the air within said combustion space without imparting directed movement thereto, the fuel injection means is positioned at the circumference of the combustion space and is directed to inject fuel in an initial narrow band across a small segment of the combustion space adjacent the periphery thereof, the said electrical ignition means being positioned closely adjacent said initial band to produce ignition thereof and establish a flame front, and the fuel injection means being constructed to continue the injection of fuel in narrow bands and in sequence immediately in advance of the flame front so that the progressively formed segments of combustible fuel vapor-air mixture are promptly burned and the said flame front swings through the combustion space about the locus of fuel injection as an axis.

13. An internal combustion engine of the character described, comprising a power cylinder having a piston operating therein and providing a disc-shaped combustion space as herein defined, air intake means for said cylinder adapted to introduce air into said combustion space and impart a high velocity of swirling movement thereto, a fuel injection nozzle carried by said cylinder to inject an atomized fuel spray into said combustion space, means for supplying fuel thereto at a temperature and pressure such that at least a portion of the first increment of injected fuel vaporizes rapidly and forms with a localized portion of the swirling air a combustible fuel vapor-air mixture with only a short travel of the fuel from the nozzle, a spark ignition device mounted on said cylinder and having electrodes positioned within said combustion space out of the direct path of liquid fuel particles of said spray but sufficiently close to said nozzle and spray that the said combustible fuel vapor-air mixture from said first increment of injected fuel contacts said electrodes substantially as soon as the said combustible mixture is formed, means coordinated with engine operation for controlling the start of injection of fuel from said nozzle during the latter part of the compression stroke of said piston, means synchronized with engine operation for producing a spark of igniting intensity at said electrodes at the time said combustible mixture formed from the first increment of injected fuel reaches said electrodes to initiate combustion and establish a flame front traveling in the opposite direction with respect to said air swirl, and means for controlling the rate and duration of injection of fuel following ignition to impregnate shortly in advance of the traveling flame front additional quantities of the swirling air at a controlled fuel-air ratio to progressively form additional combustible fuel vapor-air mixture immediately in advance of the traveling flame front which is ignited by the traveling flame front and burned substantially as rapidly as formed to provide the power required on each cycle, whereby the formation of sufficient end gases consisting of combustible fuel vapor-air mixture trapped by the flame front to cause spontaneous ignition and produce knock is prevented.

14. An internal combustion engine according to claim 13, wherein the fuel injection nozzle is positioned to inject in a generally tangential direction of the combustion space and in the direction of air swirl, and the spark ignition device is mounted so that the electrodes are near the cylinder wall on the downstream side of the nozzle and closely adjacent the side of the spray, the nozzle tip and the electrodes being spaced from each other such that the included angle between radii intersecting the nozzle tip and electrodes respectively is greater than 20° and less than 90°, so that the said electrodes are contacted by the combustible fuel vapor-air mixture formed from the first increment of injected fuel and which diffuses to the side of the spray immediately after injection and before the air swirl has swept the mixture beyond the said electrodes.

EVERETT M. BARBER.

REFERENCES CITED

The following references are of record in the file of this patent:

UNITED STATES PATENTS

| Number | Name | Date |
|---|---|---|
| 1,167,376 | Bouteille | Jan. 11, 1916 |
| 1,305,579 | Wolfard | June 3, 1919 |
| 1,693,966 | Sperry | Dec. 4, 1928 |
| 1,742,971 | Sass et al. | Jan. 7, 1930 |
| 1,767,701 | Riehm | June 24, 1930 |
| 1,834,061 | Joachim | Dec. 1, 1931 |
| 1,835,490 | Hesselman | Dec. 8, 1931 |
| 1,963,578 | Dorner | June 19, 1934 |
| 2,025,362 | Starr | Dec. 24, 1935 |
| 2,058,350 | Petter | Oct. 20, 1936 |
| 2,142,280 | Mock | Jan. 3, 1939 |
| 2,290,212 | Schweitzer | July 21, 1942 |
| 2,295,081 | Harvath | Sept. 8, 1942 |
| 2,345,256 | Hedlund | Mar. 28, 1944 |